United States Patent
Wanninger et al.

(10) Patent No.: US 7,995,882 B2
(45) Date of Patent: Aug. 9, 2011

(54) LIGHTING DEVICE COMPRISING A PLURALITY OF SEMICONDUCTOR LIGHT SOURCES

(75) Inventors: Mario Wanninger, Harting (DE);
Markus Hofmann, Bad Abbach (DE);
Günter Waitl, Regensburg (DE);
Alexander Wilm, Regensburg (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 12/166,418

(22) Filed: Jul. 2, 2008

(65) Prior Publication Data

US 2008/0285301 A1    Nov. 20, 2008

Related U.S. Application Data

(63) Continuation of application No. 11/314,150, filed on Dec. 21, 2005, now Pat. No. 7,407,303.

(30) Foreign Application Priority Data

Dec. 30, 2004  (DE) .......................... 10 2004 063 574

(51) Int. Cl.
*G02B 6/26* (2006.01)
*G02B 6/10* (2006.01)
*F21S 8/10* (2006.01)
(52) U.S. Cl. .......................... 385/31; 385/146; 362/545
(58) Field of Classification Search .................. 385/146; 362/545
See application file for complete search history.

(56) References Cited

U.S. PATENT DOCUMENTS

| | | | |
|---|---|---|---|
| 4,558,402 A * | 12/1985 | Tysoe | 362/293 |
| 5,806,965 A | 9/1998 | Deese | |
| 5,924,785 A * | 7/1999 | Zhang et al. | 362/241 |
| 5,991,474 A * | 11/1999 | Baldi | 385/15 |
| 6,305,813 B1 | 10/2001 | Lekson et al. | |
| 6,364,506 B1 * | 4/2002 | Gallo | 362/245 |
| 6,474,852 B1 * | 11/2002 | Ohkohdo et al. | 362/487 |
| 6,623,152 B1 * | 9/2003 | Kroening | 362/555 |
| 6,948,838 B2 * | 9/2005 | Kunstler | 362/545 |
| 6,991,351 B1 * | 1/2006 | Petrick | 362/373 |
| 7,134,777 B2 * | 11/2006 | Sung | 362/609 |
| 2001/0007527 A1 * | 7/2001 | Lammers et al. | 362/294 |
| 2002/0122309 A1 | 9/2002 | Abdelhafez | |
| 2003/0123262 A1 | 7/2003 | Suehiro et al. | |

(Continued)

FOREIGN PATENT DOCUMENTS

DE    20200571    1/2002

(Continued)

OTHER PUBLICATIONS

European Search Report issued on Dec. 17, 2008 for corresponding Application No. 05 027 536.1.

(Continued)

*Primary Examiner* — Uyen-Chau N Le
*Assistant Examiner* — Chris H Chu
(74) *Attorney, Agent, or Firm* — Fish & Richardson P.C.

(57) ABSTRACT

A lighting device is disclosed comprising a plurality of semiconductor light sources disposed on a carrier, wherein the light from the light sources is coupled into assigned lightguides at a set angle to the surface normals of the carrier and the lightguides are provided with reflecting and light exit faces such that the envelope of the light outcoupling faces forms a curved surface segment.

24 Claims, 4 Drawing Sheets

U.S. PATENT DOCUMENTS

| | | | | |
|---|---|---|---|---|
| 2005/0122742 | A1* | 6/2005 | Ho | 362/615 |
| 2006/0002141 | A1* | 1/2006 | Ouderkirk et al. | 362/609 |
| 2006/0256578 | A1* | 11/2006 | Yang et al. | 362/609 |

FOREIGN PATENT DOCUMENTS

| | | |
|---|---|---|
| DE | 10336471 | 5/2003 |
| DE | 20318691 | 12/2003 |
| DE | 102004001052 | 11/2004 |
| DE | 102004020493 | 11/2005 |
| EP | 1172253 | 7/2001 |
| EP | 1 327 558 | 7/2003 |
| EP | 1 106 913 | 5/2005 |
| GB | 2 350 176 | 11/2000 |
| GB | 2372091 | 8/2002 |
| JP | 57-93393 | 6/1982 |
| JP | 9-127507 | 5/1997 |
| JP | 2003-59313 | 2/2003 |
| JP | 2004-275580 | 10/2004 |
| WO | 02/066889 | 8/2002 |
| WO | 2004/044481 | 5/2004 |

OTHER PUBLICATIONS

European Search Report for Application No. 05 027 536.1 dated Jun. 8, 2007.

Fischer U., "Fluoreszierendes Acrylgas—in der Lichtwerbung zuwenig verwendet", Licht, No. 5, pp. 556-561 (2000).

Japan Patent Office, "Translation of the Reason for Rejection", issued on Apr. 22, 2010 (2 pages).

Japan Patent Office, "Translation of the Final Notification of Reasons for Refusal (type II office action)", Japan Patent Application No. 2006-000251, mailed on Jan. 21, 2011 (4 pages).

* cited by examiner

LIGHTING DEVICE COMPRISING A PLURALITY OF SEMICONDUCTOR LIGHT SOURCES

CROSS REFERENCE TO RELATED APPLICATION

This application is a continuation of and claims priority to U.S. patent application Ser. No. 11/314,150, filed Dec. 21, 2005 now U.S. Pat. No. 7,407,303, which claims priority to German Patent Application No. 10 2004 063 574.9, filed Dec. 30, 2004. The contents of the prior applications are incorporated herein by reference in their entirety.

TECHNICAL FIELD

This invention concerns a lighting device comprising a plurality of semiconductor light sources disposed on a carrier.

BACKGROUND

Lighting devices, particularly for signal lamps, have heretofore been implemented in a wide variety of ways. Rotating effects of the kind used in blue or orange lights on vehicle roofs have heretofore been achieved primarily by means of a conventional incandescent bulb with an associated reflector that is set in rotation by a motor. The reflector is used for beam forming. A device of this kind is onerous and trouble-prone.

A number of solutions now exist for signal lamps with flashing and rotating effects in which light-emitting diodes (LEDs) are used to generate light.

For example, an LED-based signal lamp is known from the document WO 02/066889 A1. In this signal lamp, LEDs are disposed on printed circuit boards, which themselves are then arranged in a ring around a light body. The advantage of such a signal lamp utilizing LEDs is that rotating and flashing effects can be achieved by electronically driving the individual LEDs without the need for mechanical rotation of part of the lighting device to produce rotating effects. A further advantage of using LEDs is their service life and low maintenance requirements.

The document U.S. Pat. No. 5,806,965 describes an arrangement in which the LEDs are mounted on a curved surface.

In arranging LEDs on curved surfaces, the conventionally used standard placement techniques designed for planar printed circuit boards (PCBs) cannot be utilized. Arranging planar pieces of PCB in a curved surface shape necessitates onerous wiring of the individual pieces of board. This requires more effort, and higher costs are the result.

SUMMARY

The object of certain aspects of the present invention is to specify a lighting device of the species recited at the beginning hereof that permits an improvement in a cost-effective manner.

According to at least one aspect of the invention, it is provided to dispose a plurality of semiconductor light sources such as light-emitting diodes (LEDs), organic LEDs or lasers on a preferably planar carrier. Semiconductor light sources also include radiation-emitting chips disposed on a PCB through the use of on-board technology, as well as all types of radiation-emitting semiconductor structures, including those whose emissions lie outside the visible spectrum. For a signal lamp, however, a semiconductor light source that emits visible light directly is particularly advantageous.

An LED is particularly suitable for use as a semiconductor light source. The LED preferably comprises a semiconductor chip based on a III/V compound semiconductor material. Light can be generated particularly efficiently with III/V compound semiconductor materials, especially in the visible range of the spectrum.

The arrangement of the semiconductor light sources on the carrier, particularly on a common planar carrier for all the semiconductor light sources—a PCB, for instance—can be effected by means of conventional standard mounting processes. An SMD (Surface Mountable Device) LED component can advantageously be disposed on the carrier in this way in a particularly simple and space-saving manner. SMD LED components facilitate compact implementation of the lighting device.

The light from the semiconductor light sources couples into a deflecting optic. In addition to its deflecting function, the deflecting optic simultaneously performs a light-guiding function (deflecting lightguide). In so doing, the deflecting optic distributes the light coupled in from the semiconductor light source preferably largely uniformly on a light outcoupling face of the deflecting optic. Through the deflecting optic, the light is coupled out and emitted in the desired radiation direction. This takes place particularly in a direction that includes a set angle with respect to the carrier, e.g. in a direction parallel to the carrier. One, preferably exactly one, deflecting optic is preferably assigned to each semiconductor light source, thereby simplifying the precise deflection in a set direction of the light generated in individual light sources.

The deflecting optic preferably comprises a reflector configured such that it deflects the light toward the light outcoupling face. The deflector preferably deflects the light directly onto the light outcoupling face, which is preferably formed by a surface of the deflecting optic.

The arrangement and configuration of the reflectors and the light outcoupling faces of the deflecting lightguide determines the light emission of such a device, particularly its radiation characteristic. The use of plural, preferably discrete, deflecting lightguides advantageously makes it possible to achieve light output of up to 360° around the lighting device. Flashing or rotating effects can be produced by suitable driving of the individual semiconductor light sources.

The reflector is preferably a reflecting face configured or disposed on the deflecting optic. The reflecting face is preferably a surface of the deflecting optic, particularly of the lightguide. The reflecting face can be implemented, for example by suitable structuring with a reflector structure, as totally reflecting for light striking the reflecting face from a set direction, e.g. from the direction of the semiconductor light source. A toothed structure or a grooved structure, for example, are suitable for this purpose. Alternatively or additionally, the reflecting face can be coated with a reflection-enhancing material, e.g. a metal layer.

In a preferred configuration of the deflecting optic, the distance between its light exit face and its reflecting face decreases with increasing distance from a semiconductor light source assigned to the deflecting optic or with increasing distance from the light exit face thereof. This is achieved in a technically advantageous manner by having the deflecting optic taper as it extends away from the semiconductor light source or the carrier. Such a design for the deflecting optic makes it possible in a technically simple manner to bring about largely homogeneous, i.e. uniform, illumination of the light exit face of the deflecting optic and thus a largely homogeneous radiation output from the lighting device.

The main direction of extent of the light exit face of the deflecting optic and the main direction of extent of the reflecting face of the deflecting optic preferably form an acute angle. This is preferably smaller than 45°, particularly preferably smaller than 25°. This facilitates the directed reflection of light in the deflecting optic to the light exit face thereof.

Viewed in the emission direction of the deflecting optic, the reflecting face and the light exit face of the deflecting optic overlap preferably completely, whereby largely homogeneous illumination of the light exit face can be effected in a technically simplified manner.

In a further preferred configuration, the reflecting face and the semiconductor light source overlap. Particularly preferably, the reflecting face and the semiconductor light source overlap completely. This ensures in a technically relatively simple manner that light generated by the semiconductor light source will impinge substantially entirely on the reflecting face. This is advantageous for the homogeneity of the illumination of the light exit face, which is preferably achieved primarily or completely by reflection from the reflecting face toward the light exit face.

The light exit face and/or the reflecting face can be implemented as curved, or they can be planar in their basic conformation, i.e. particularly apart from an intended reflector structure.

If the light exit face is implemented as planar, then the reflecting face is also preferably planar in its basic conformation. If the light exit face is implemented as curved, then the reflecting face is preferably also implemented as curved. If the light exit face is implemented as convex (concave) as viewed from outside the deflecting optic, then the reflecting face is preferably implemented as concave (convex) as viewed from outside the deflecting optic.

Homogeneous illumination of the light exit face and consequently a homogeneous radiation output from the lighting device can be achieved in a simplified manner by means of diverse, particularly mutually adapted, curvatures of the light exit face and the reflecting face or by implementing the reflecting face and the light exit face as planar.

In a preferred configuration, the light exit face of a first deflecting optic, particularly as viewed from the carrier outward, is disposed above the light exit face of a second deflecting optic. These deflecting optics are preferably assigned to different semiconductor light sources. The second deflecting optic in this case is preferably assigned to a semiconductor light source that is disposed closer to an edge of the carrier than a semiconductor light source assigned to the first deflecting optic. The first deflecting optic preferably overlaps with the second deflecting optic. Particularly preferably, the light exit faces of the two deflecting optics abut substantially flush with each other. This simplifies the obtainment of a homogeneous radiation output from the lighting device. The two semiconductor light sources are preferably suitable for generating multicolored light, so that different-colored light can be decoupled from the light exit faces of different deflecting optics.

Furthermore, the distance from the carrier of the light exit face of the first deflecting optic assigned to a semiconductor light source is preferably greater than that of the light exit face of a second deflecting optic assigned to a further semiconductor light source disposed closer to the edge of the carrier. The two semiconductor light sources are preferably arranged next to each other, particularly in the radial direction, on the carrier.

The second deflecting optic, whose light exit face is disposed closer to the carrier, is preferably implemented as flattened on its side facing away from the carrier, so that a first deflecting optic can rest on the flattened region or be attached thereto. To this end, the deflecting optic that is to be placed or attached is advantageously implemented as flattened on its side facing the carrier.

The carrier of the semiconductor light sources can preferably be implemented as a conventional printed circuit board. Examples hereof are FR4-, FR2-, metal-core and CEM1 carriers or other, also flexible, PCBs.

A control element is preferably also disposed on the carrier. For this purpose, at least one control chip with integrated circuits can be mounted on the carrier in a standard process.

In a preferred manner, the envelope of the light coupling surfaces of the deflecting optics constitutes a surface segment that is curved outwardly with reference to the light exit direction. Up to 360° of illumination of the space surrounding the lighting device can be achieved in this way.

The carrier is preferably disposed in a well. This, in conjunction with a transparent cover, preferably forms a housing. On the carrier, the deflecting optics are located in the cover. A transparent cover can be implemented for example in the form of a glass bell of the kind used with blue lights.

In a further advantageous embodiment, after mounting the lighting device can be completely encapsulated or firmly sealed in a housing.

Multicolored semiconductor light sources such as LEDs, so-called multi LEDs, single-color or different-colored LEDs can be used in the lighting device. Multicolored lighting effects can be achieved by means of multi-colored or different-colored semiconductor light sources. Instead of single-colored semiconductor light sources of different colors, multicolored semiconductor light sources can advantageously be used to generate light of different colors or different mixed colors. A multicolored LED comprises for example a plurality of semiconductor chips, at least two of which are suitable for generating light of different colors. A multicolored semiconductor light source preferably comprises three semiconductor chips which in pairs can generate different-colored light, e.g. of the primary colors red, green or blue.

In a further preferred embodiment, the light from different-colored LED light sources or a multi LED can be mixed in the deflecting lightguides. This permits or facilitates the obtainment of mixed-color lighting effects.

Another preferred embodiment provides for configuring the lighting device as a signal lamp. Special signal lamp functions such as flashing or rotating effects can be obtained by suitable driving of the semiconductor light sources.

A particularly preferred embodiment makes it possible to drive the semiconductor light sources at an adjustable frequency to achieve a rotating or a flashing effect with the emitted light. The invention thereby permits a broad range of applications. For example, it can serve as a blue light on emergency vehicles or as a flashing light on construction vehicles. It can be disposed on electrical machinery of the kind used for example in production or at airports, to indicate the operating status thereof. Furthermore, such signal lamps can also be used on vehicles as reverse lights, turn signals or CHMSL (Center High Mounted Stop Lamps), e.g. for a third brake light. Through the use of different signal sequences or flash rates, such signal lamps can also provide unambiguous signals for people with color vision impairment, for example color blindness. Such signal lamps can also be used for the hearing-impaired as a substitute for acoustical signals.

A further preferred embodiment of the invention provides that a collimating lens or lenses be disposed on the deflecting lightguide(s) in the region of the light entrance.

In a particularly preferred embodiment, the collimating lens(es) is (are) fashioned integrally with the deflecting lightguide(s).

The lens is preferably implemented as a stepped lens. This further preferably comprises a central region curved for example in the manner of an aspherical lens and surrounded by one or more preferably confocally arranged and/or annularly implemented reflector faces. The central region and the reflector face(s) are preferably configured on the light entrance side of the lens. The curved central region and the reflector faces are preferably configured and matched to one another in such a way that the light entering the optic is collimated and for example converted into a parallel beam immediately at the entrance end. In this way, light striking the reflecting face of the deflecting optic, after entering the deflecting optic with preliminary beam forming by the collimating lens, can in a simplified manner already be largely evenly distributed and can strike the reflecting face homogeneously.

The reflecting face of the deflecting lightguide preferably permits uniform light output over the entire light exit face.

In a preferred improvement of the invention, some of the light from the deflecting lightguide can also be coupled out at the side opposite the incoupling surface.

Further features, preferences and suitabilities of the invention will emerge from the exemplary embodiments described hereinbelow in connection with FIGS. 1 to 5.

In the figures, identical, similar or like-acting elements have been provided with the same respective reference numerals.

DETAILED DESCRIPTION

Figure 1:
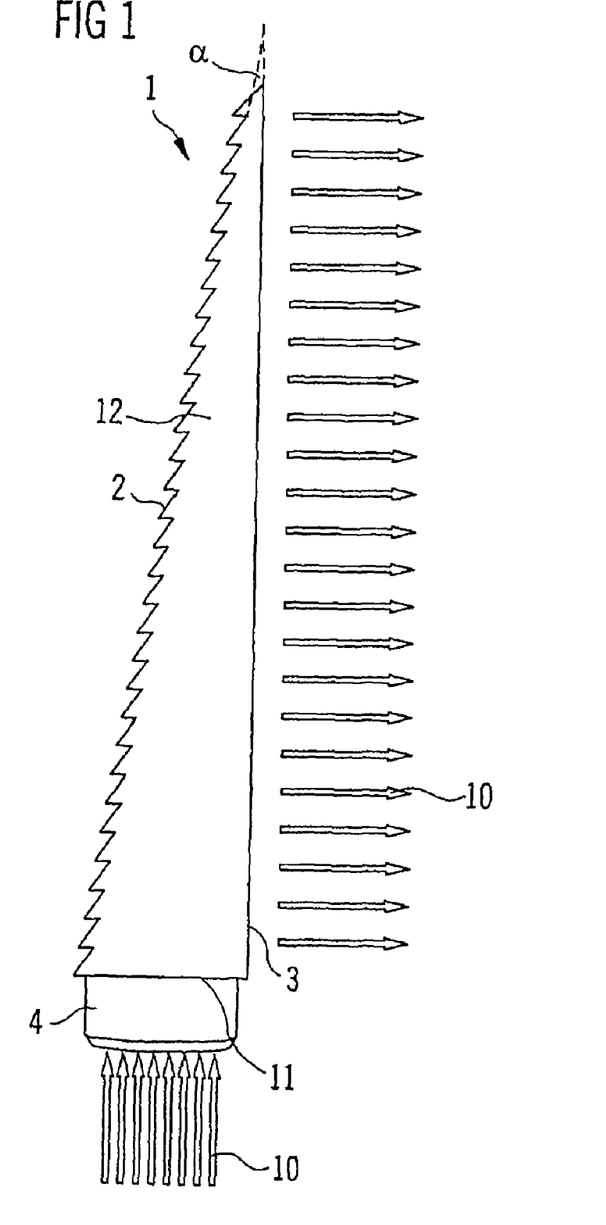
FIG. 1 is a schematic cross-sectional diagram of a deflecting lightguide.

FIG. 1 shows an advantageous embodiment of the deflecting lightguide 1 with a reflecting face 2, a light outcoupling surface 3 and an optic 4. The reflecting face overlaps preferably completely with the optic 4. The light entrance region into the main body 12 of the lightguide is preferably formed by the lens-overlapping region of a light entrance face 11 through which light enters the main body 12 of the lightguide. In this exemplary embodiment, the angle between the main direction of incidence of the light 10 and the direction of diffraction of the light, particularly after passing through the deflecting lightguide, is 90°, corresponding to the intermediate angle of the surface normals of a light entrance face 11 of the deflecting lightguide and those of the light exit face 3. Other deflecting angles can also be implemented in further embodiments. In particular, one or more light exit faces can also be disposed on the side opposite the light entrance face, so that some of the light passes through the lightguide rectilinearly, without being deflected.

The reflecting face 2 can basically perform two functions. It can bring about a uniform distribution of light in the lightguide 1, and thus homogeneous outcoupling of the light at the light exit face. It can also assume the desired light deflection function. The reflecting face 2 can be implemented for this purpose in a variety of ways. Stepped, grooved and/or toothed patterns on the surface of the reflecting face can effect both deflection of the light, for example by means of total reflection, and uniform distribution, particularly of the outgoing luminous flux. Alternatives to structuring the reflecting face are possible metallization or vapor-coating of the surface. These methods can also be used on a structured surface.

The inclination of the reflecting face 2 with respect to the light exit face 3 and the distance between these two surfaces can also contribute to a desired distribution of light in the lightguide and to homogeneous outcoupling. To this end, the angle of inclination $\alpha$ is preferably smaller than 45°, particularly preferably smaller than 25°, e.g. 20° or less. The deflecting lightguide is further preferably implemented with a trianguloid basic shape, optionally with a flattened apex, particularly in the manner of a right triangle. The direction of deflection of the light can be varied via the distance between and inclination of the reflecting faces.

The optic 4 influences the incoupling behavior of the light from semiconductor light source 7. The optic 4 can be attached fixedly with respect to the main body of the deflecting lightguide 1, e.g. it can be integral or glued thereto, or it can be implemented as separate therefrom. An optic 4 can be implemented with the use of known optically active elements or combinations thereof, provided that the desired deflecting effect in conjunction with reflecting face 2 can be achieved. By way of example, optics can include components such as lenses, diffractive optics, divergent lenses, prismatic lenses or combinations thereof. In a preferred embodiment, the optic 4 can be a collimating optic that couples parallel light into the lightguide.

Figure 2A:
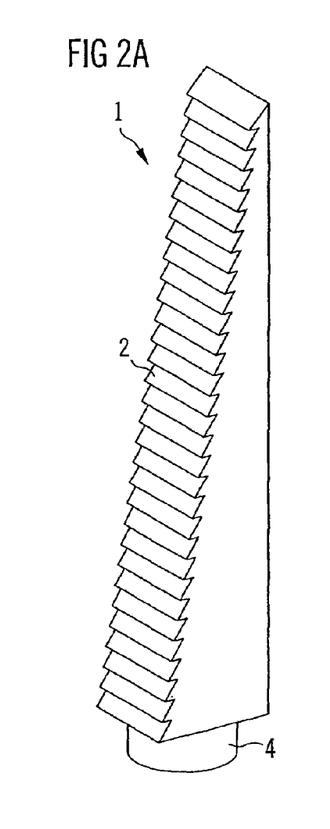
FIGS. 2a, 2b, and 2c show perspective diagrams of a deflecting lightguide.
Figure 2B:
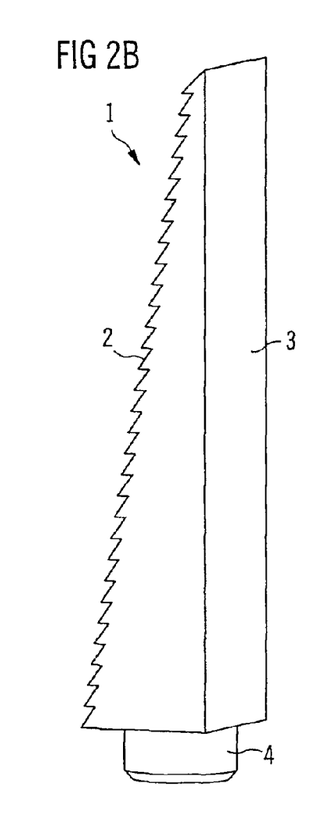
Figure 2C:
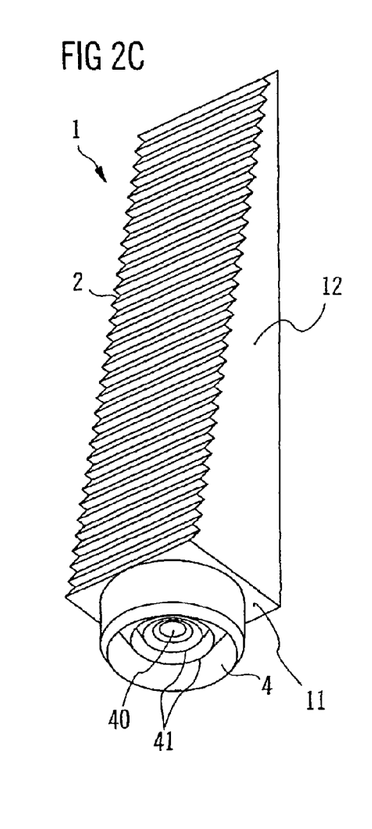

FIGS. 2a to 2c show various perspective views of a preferred embodiment of a deflecting lightguide 1. Disposed on the underside of the deflecting lightguide 1 is the optic 4. This is preferably implemented as a rotationally symmetrical stepped lens possessing a curved central region 40 which on the light entrance side is aspherical, particularly convex as viewed from the outside, and a plurality of annular reflector faces 41 that are preferably arranged confocally or are implemented as frustum-of-a-cone-shaped, annular jacket surfaces extending around the central region. These elements face away from the light entrance face 11 through which light enters the main body 12 of the deflecting lightguide (see optic 4 in FIG. 2c). A stepped lens is particularly suitable for parallelizing the light beams generated by a semiconductor light source before they enter the deflecting lightguide. In this specific embodiment, reflecting face 2 is provided with a toothed or a grooved structure, particularly for total reflection, that serves to reflect the light coupled in through optic 4 onto light exit face 3. The upwardly tapering shape of the deflecting lightguide 1, in conjunction with the structure of reflecting face 2, permits substantially uniform outcoupling of light over the entire outcoupling face 3. The optic 4 in this exemplary embodiment is a collimating optic fashioned integrally with the deflecting lightguide, e.g. cast, for example injection-molded, therewith.

Figure 3:
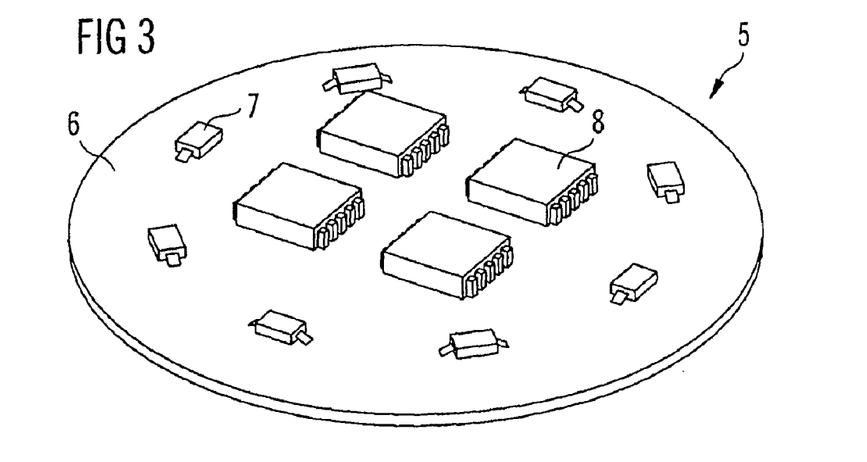
FIG. 3 is an exemplary embodiment of an inventive lighting device.

FIG. 3 shows the base 5 of an inventive embodiment of the lighting device. Here, plural semiconductor light sources 7, preferably single-, different- or multi-colored SMD LED components, are disposed on a carrier 6 and are in particular mounted thereon. In addition, at least one integrated circuit is disposed on the same carrier as a control element 8 for the LEDs. In this exemplary embodiment, eight semiconductor light sources are arranged in a circle. The carrier is preferably configured as circular in plan. In other exemplary embodiments, different arrangements or a different number of semiconductor light sources can be used. In this exemplary embodiment the control element 8 of the semiconductor light sources takes the form of four integrated circuits. In other exemplary embodiments, a different number of integrated circuits can also be used on the carrier 6. The control element 8 serves to drive the semiconductor components, but in other exemplary embodiments it can also take on additional functions, e.g. dimming the light by pulse width modulation (PWM) driving of the light sources.

Figure 4:
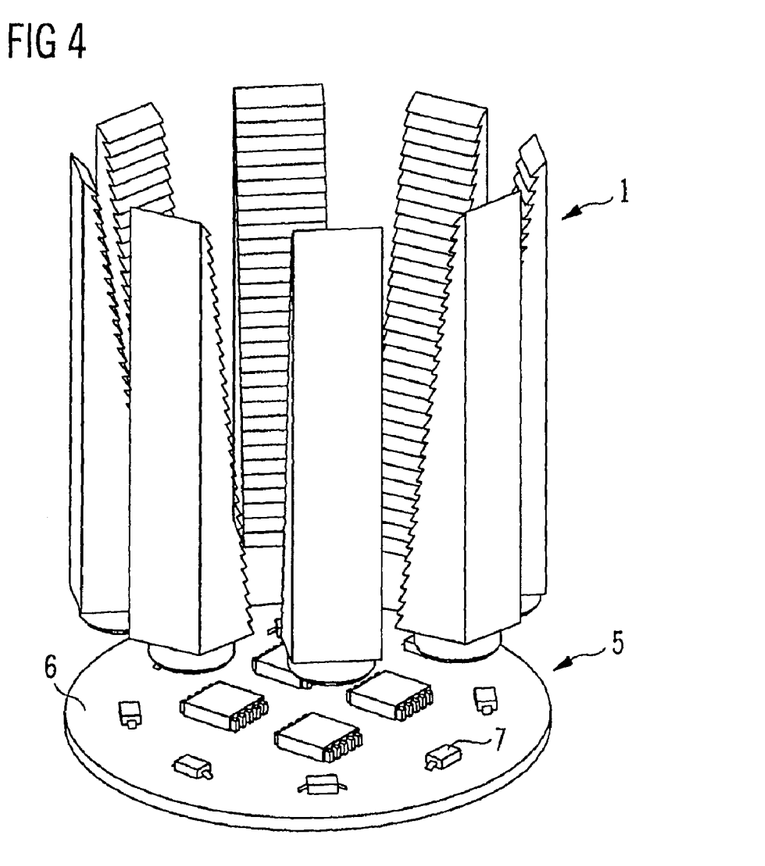
FIG. 4 is a perspective diagram of a base unit for the lighting device with illustrations of the assignment of the deflecting lightguides.

FIG. 4 schematically depicts an inventive embodiment of the lighting device in its basic structure. On a base 5, plural semiconductor light sources 7 are disposed on a carrier 6. A possible arrangement for deflecting lightguides is indicated in perspective above the base 5. Through the interaction of the deflecting lightguides 1 with the base 5, light output of up to 360° around the lighting device can be achieved relative to the surface normals of the base 5, for example in the azimuthal direction to these surface normals. In this embodiment, eight semiconductor light sources are used with eight deflecting lightguides. However, a different number of semiconductor light sources and/or deflecting lightguides can also be used in further embodiments. Both more and fewer semiconductor light sources can be used. More or fewer deflecting lightguides can likewise be provided, there being no need to correlate the number of semiconductor light sources with the number of deflecting lightguides. In particular, embodiments are conceivable that employ more light sources than deflecting lightguides, and in which for example the light from different semiconductor light sources having different-colored emissions can be mixed and output in few lightguides, particularly in one common lightguide.

Figure 5A:
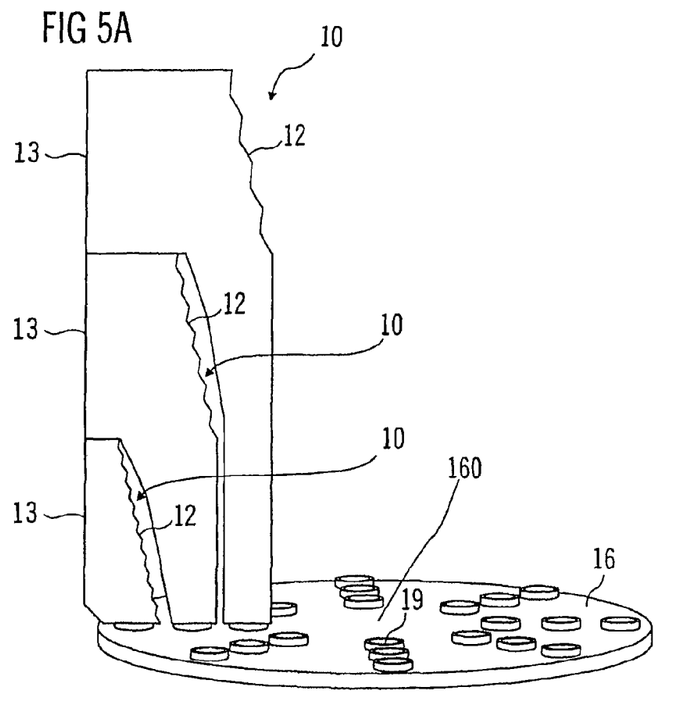
FIGS. 5a and 5b show a further possible base unit comprising a plurality of light deflectors (FIG. 5a) and an exemplary embodiment of the lighting device comprising a plurality of deflecting lights on a base (FIG. 5b).
Figure 5B:
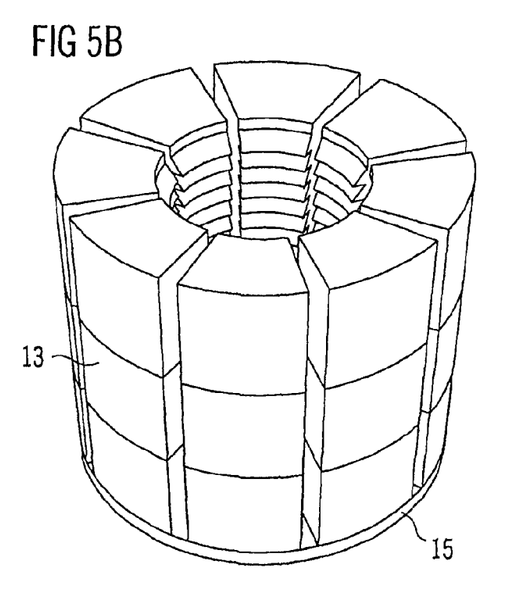

FIG. 5a schematically depicts the arrangement of plural lightguides 10 with light outcoupling faces 13 and reflecting faces 12 for a further embodiment via a regional partial sectional view through FIG. 5b. On a common carrier 16, plural semiconductor light sources, preferably with assigned optics 19, are arranged adjacently and extending radially outward from a central region 160 of the carrier 16. The light sources can be arranged on the carrier in a stellate or a radiating configuration. Each light source with its optic 19 is assigned to a separate lightguide. In this embodiment, the light outcoupling faces 13 of different deflecting lightguides are arranged one above the other, with the individual deflecting lightguides overlapping with one another and being suitably flattened so that they can be disposed or secured one atop the other. The light exit faces 13 of different deflecting lightguides preferably abut flush with one another. In addition, the light from each light source is coupled separately into an assigned deflecting lightguide. In this exemplary embodiment multicolored signals can thereby be produced, particularly simultaneously, by means of the lighting device. The optic 19 can optionally also be attached to the lightguide concerned or fashioned integrally therewith. In addition, the reflecting faces are each implemented as concavely curved and light exit faces 13 as convexly curved when viewed from the outside.

An advantageous improvement consists in connecting the optics fixedly to the semiconductor light sources and thus eliminating the need for an additional optic on the light entrance face of the deflecting lightguide. Additional control elements can be arranged on carrier 16 in this exemplary embodiment as well. Through the use of different-colored semiconductor light sources, for example a kind of traffic signal effect can be achieved with the three light outcoupling faces 13 located one above the other.

The angles of inclination of the reflecting face to the light exit face of the deflecting lightguide concerned are preferably smaller than 45°, particularly preferably smaller than 25°, e.g. 20° or less. In addition, the angles of inclination for different deflecting lightguides whose light exit faces are disposed one above the other are preferably the same.

FIG. 5b shows in perspective a complete lighting device according to exemplary embodiment 5a. Here, eight deflecting lightguide arrangements of the kind depicted schematically in FIG. 5a are arranged in a circle on a base 15. Three light outcoupling faces 13 are located one above the other within respective ranges of radiation angles. In further embodiments, both fewer and more light outcoupling faces can be arranged one above the other in order to achieve different, including different-colored, signal states.

The invention is not limited by the description based on the exemplary embodiments. Rather, the invention encompasses any novel feature and any combination of features, including in particular any combination of features covered by the claims, even if that feature or combination itself is not explicitly mentioned in the claims or exemplary embodiments.

What is claimed is:

1. A signal lamp comprising:
   a plurality of semiconductor light sources disposed on a carrier, and
   a driver for the semiconductor light sources that produces flashing or rotating effects;
   wherein light from the light sources is coupled into assigned lightguides at a set angle to a surface normal of the carrier;
   said lightguides are provided with reflecting faces and light exit faces, the reflecting faces deflecting the light onto the light exit faces, and
   the light exit faces are arranged in such a way that the light emitted through the light exit faces provides light output of 360 degrees around the signal lamp in the azimuthal direction to the surface normal;
   wherein the reflecting faces are concavely curved and the light exit faces are convexly curved when viewed from the outside of the signal lamp.

2. The signal lamp according to claim 1, wherein the light exit faces collectively define a curved surface.

3. The signal lamp according to claim 2, wherein the curved surface is curved outwardly with respect to a light exit direction.

4. The signal lamp according to claim 1, wherein said carrier is a planar printed circuit board.

5. The signal lamp according to claim 1, wherein a control element for the semiconductor light sources is disposed on the carrier.

6. The signal lamp according to claim 1, wherein multi-colored LEDs or different-colored LEDs are disposed on the carrier.

7. The signal lamp according to claim 6, wherein light from different-colored light sources is mixed in at least one of the lightguides.

8. The signal lamp according to claim 1, wherein a collimating optic is assigned to a light incoupling face of a first lightguide of the lightguides.

9. The signal lamp according to claim 8, wherein the collimating optic is fashioned integrally with the first lightguide.

10. The signal lamp according to claim 1, wherein the reflecting faces are arranged to bring about uniform light output over the entire light exit faces.

11. The signal lamp according to claim 1, wherein the reflecting faces have at least one pattern selected from the group: stepped, grooved, and toothed.

12. The signal lamp according to claim 1, wherein the driver is operable to drive the semiconductor light sources at an adjustable frequency to achieve a flashing effect.

13. The signal lamp according to claim 1, wherein the driver is operable to drive the semiconductor light sources at an adjustable frequency to achieve a rotating effect.

14. The signal lamp according to claim 1, wherein at least one of the lightguides contains a wavelength-converting material.

15. The signal lamp according to claim 1, wherein the lightguides are discrete.

16. The signal lamp according to claim 1, wherein the lightguides comprise at least a first lightguide and a second lightguide, a light exit face of the first lightguide and a light exit face of the second lightguide being located one above the other relative to the carrier.

17. The signal lamp according to claim 16, wherein a distance from the carrier to a light exit face of the first lightguide is greater than a distance from the carrier to the light exit face of the second lightguide and a semiconductor light source of said semiconductor light sources corresponding to the second lightguide is disposed closer to an edge of the carrier than a semiconductor light source of said semiconductor light sources corresponding to the first lightguide.

18. The signal lamp according to claim 1, wherein the lightguides have a trianguloid basic shape.

19. The signal lamp according to claim 1, wherein the light exit faces collectively define a substantially cylindrical surface.

20. A signal lamp comprising:
a plurality of semiconductor light sources, and
a driver for the semiconductor light sources that produces flashing or rotating effects, the plurality of semiconductor light sources and the driver being disposed on a common carrier; wherein
the light from the light sources is coupled into assigned lightguides at a set angle to a surface normal of the carrier;
said lightguides are provided with light incoupling faces;
a collimating optic is assigned to each of said incoupling faces;
said collimating optic is fashioned integrally with said lightguides;
said lightguides are provided with reflecting and light exit faces, the reflecting faces deflecting the light onto the light exit faces, and
the light exit faces are arranged such that the light emitted through the light exit faces provides light output of 360 around the signal lamp in the azimuthal direction to the surface normal;
wherein the reflecting faces are concavely curved and the light exit faces are convexly curved when viewed from the outside of the signal lamp.

21. The signal lamp as claimed in claim 20, wherein the collimating optic is a stepped lens.

22. The signal lamp as claimed in claim 20, wherein the lightguides are implemented with the basic shape of a right triangle.

23. A signal lamp comprising:
a plurality of semiconductor light sources, and
a driver for the semiconductor light sources that produces flashing or rotating effects, the plurality of semiconductor light sources and the driver being disposed on a common carrier;
wherein the light from the light sources is coupled into assigned lightguides at a set angle to a surface normal of the carrier;
said lightguides are provided with reflecting and light exit faces, the reflecting faces deflecting the light onto the light exit faces;
the reflecting faces are concavely curved and wherein the light exit faces are convexly curved when viewed from the outside of the signal lamp; and
the light exit faces are arranged such that the light emitted through the light exit faces provides light output 360 around the signal lamp in the azimuthal direction to the surface normal.

24. The signal amp as claimed in claim 23, wherein light exit faces of adjacent lightguides abut flush with one another.

* * * * *

UNITED STATES PATENT AND TRADEMARK OFFICE
CERTIFICATE OF CORRECTION

| | | |
|---|---|---|
| PATENT NO. | : 7,995,882 B2 | Page 1 of 1 |
| APPLICATION NO. | : 12/166418 | |
| DATED | : August 9, 2011 | |
| INVENTOR(S) | : Mario Wanninger et al. | |

It is certified that error appears in the above-identified patent and that said Letters Patent is hereby corrected as shown below:

In Claim 20, Column 10, line 7, after "360" and insert -- degrees --.

In Claim 23, Column 10, line 34, after "360" and insert -- degrees --.

In Claim 24, Column 10, line 37, delete "amp" and insert -- lamp --.

Signed and Sealed this
Eighth Day of November, 2011

David J. Kappos
*Director of the United States Patent and Trademark Office*